US007818919B1

(12) United States Patent
Maxwell-Merrill et al.

(10) Patent No.: US 7,818,919 B1
(45) Date of Patent: Oct. 26, 2010

(54) BOTANICALLY STUDDED EDIFICE

(76) Inventors: Claudio Betances Maxwell-Merrill,
823 2nd St., Apt. 812, Milwaukee, WI
(US) 53203; Gloribed Rivera-Torres,
823 2nd St., Apt. 812, Milwaukee, WI
(US) 53203; Joseph Alan Werla, 4334
No. Hazel St., Apr. 607, Chicago, IL
(US) 60613

( * ) Notice: Subject to any disclaimer, the term of this
patent is extended or adjusted under 35
U.S.C. 154(b) by 46 days.

(21) Appl. No.: 12/329,602

(22) Filed: Dec. 7, 2008

(51) Int. Cl.
*A01G 9/02* (2006.01)
(52) U.S. Cl. .......................................................... 47/83
(58) Field of Classification Search ............... 47/82,
47/83; 52/609; 405/262, 286
See application file for complete search history.

(56) References Cited

U.S. PATENT DOCUMENTS

| | | | |
|---|---|---|---|
| 1,217,239 A | | 2/1917 | Schwartz |
| 2,513,711 A | * | 7/1950 | Cain .............................. 47/83 |
| 2,514,536 A | | 7/1950 | Burney |
| 3,252,252 A | * | 5/1966 | Muelberger, Jr. ............... 47/82 |
| 3,302,324 A | * | 2/1967 | MacDonald et al. .......... 47/79 |
| 3,389,499 A | * | 6/1968 | Haile ............................. 47/33 |
| 4,521,138 A | | 6/1985 | Steiner |
| 4,658,541 A | * | 4/1987 | Haile ............................. 47/83 |
| 4,798,499 A | * | 1/1989 | Yamada ...................... 405/286 |
| 4,964,761 A | * | 10/1990 | Rossi ......................... 405/286 |
| 4,993,206 A | * | 2/1991 | Pardo ........................ 405/286 |
| 5,214,898 A | * | 6/1993 | Beretta ........................ 52/606 |
| 5,601,384 A | * | 2/1997 | Dawson ..................... 405/284 |
| 5,741,339 A | * | 4/1998 | DuMars et al. ................ 8/611 |
| D415,845 S | * | 10/1999 | Staten et al. ............... D25/113 |
| 6,681,542 B2 | * | 1/2004 | Pribyl ......................... 52/606 |
| 6,874,293 B2 | | 4/2005 | Manthei |
| 7,627,983 B1 | * | 12/2009 | Deutsch-Aboulmahassine ............ 47/83 |

* cited by examiner

*Primary Examiner*—Francis T Palo
(74) *Attorney, Agent, or Firm*—Loyd W. Bonneville

(57) ABSTRACT

A concrete construction block is formed with a large cavity toward the exterior side of the wall of which it becomes part. The cavity, or protrusion, is shaped to extend outward at the top but angled or recessed back at the bottom to coincide with the foremost edge of the block's rectangular bottom. The cavity may be shaped in any of several ways but the top portion extends forward more or less in the manner of a flowerpot so it may be filed with soil to support plants planted therein. Drainage is provided so that water descending from one block flows into the plant bed of a block below. A large number of these planter-blocks economically provide a cooling effect upon the building's interior for scientifically established reasons related to botanical function of the plants.

12 Claims, 6 Drawing Sheets

BOTANICALLY STUDDED EDIFICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention
Masonry; Construction
2. Description of Related Art

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term botanical well of planter-block's second portion (121) might be used in one instance but in another, if meaning is otherwise clear from context, expression might be shortened to botanical well (121) or merely well (121). Any of those forms is intended to convey the same meaning.

The term attach or fasten or any of their forms when so used means that the juncture is of a more or less permanent nature, such as might be accomplished by nails, screws, welds or adhesives. Thus it is stated herein that prior art concrete masonry blocks (501) were made part of a wall (502) by means of attachment. A connection in which an object would be easily removed from another would be described by the word emplace, as where it is stated herein that pebbles or similar material may be emplaced beneath the soil (201) bed of a planter-block's botanical well (121). Employment of the words connector join or any of their forms is intended to include the meaning of any of those terms in a more general way.

The word comprise may be construed in any one of three ways herein. A term used to describe a given object is said to comprise it, thereby characterizing it with what could be considered two-way equivalency in meaning for the term. Thus, it is stated that a planter-block's second portion (12) comprises that disposed toward its face (151), meaning that the latter is in fact the former and the former, the latter. The term comprise may also be characterized by what might be considered one-way equivalency, as when it is stated herein that in many variants of the invention, vertical interior ducts (192) comprise the planter-block's sole drainage means (19). This use of the word has a generic sense to it. That is, a drainage overflow channel (191) will always be the planter-block's drainage means (19) but those means (19) may be a drainage overflow channel (191) in one case but something else in another. However, the word comprise may also be used to describe a feature which is part of the structure or composition of a given object. Thus, the planter-block (1), like the prior art concrete blocks (501), is said to preferably comprise spacing knuckles (16). The meaning in the respective cases is clear from context, however. Accordingly, modifying words to clarify which of the three uses is the intended one seem unnecessary.

Terms relating to physical orientation such as top or bottom, upper or lower, upwards or downwards, refer to the positioning of an object in the manner in which it would be typically oriented for use or viewing. Both the reinforcement alignment block hollows (111) and the botanical well (121) of the subject matter hereof are, thus, said to extend from the top (153) of the planter-block (1) to a point proximate its bottom (154); and the bottom of one block (1, 501) in a wall (2) is stated to comprise size exactly fitting the four corners (17, 517) of the top of another (1, 501) therein (2). It is further stated in reference to one of the drawings, that the top row of planter-blocks (1) is left uncovered for viewing purposes. and that many of the retainer walls formed by prior art blocks (501) are upwardly terraced. It is also stated that in a variant in which the block's face (151) might be tapered upward, the distance from its top (153) to its backside (152) would be greater than the distance to that point (152) along its bottom (154). Extension from one side (155) to the other (155) of the block's face (151) is spoken of as its (151) longitudinal aspect. The wall itself (2) is recognized as having interior (21) and exterior (22) outer, sides—inner and outer, respectively; and it is insisted that it (2) be vertically straight, as distinguished from upward/y terraced as in the case of retaining walls. Optional arrangements of the planter-blocks (1) therein (2) may comprise horizontal rows, vertical columns or diagonals. An overflow channel (191), where present, is said to extend from the bottom an the emergence cleft (13) to the block's bottom (154). Moreover, the block's drainage means (19) is required to comprise vertical interior ducts (102). Those terms should be understood to retain their intended meaning with reference to parts of the subject matter hereof just as though they were oriented as generally situated and observed. Thus, the meaning would remain the same even if it were possible to orient those objects in some other manner—upside down, for instance.

The word generally, with reference to some descriptive aspect of the subject matter hereof merely indicates a slight deviation from too precise a limitation the more specific would define. Thus, the mortared joint or seam (24) between two horizontally adjoining blocks (1) is stated to be aligned generally with the longitudinal midpoint of a block (1) disposed immediately below it (24).

The term reference bearings merely denotes the viewed aspects of an object being considered such as, with reference to the planter-block (1), the top (153), bottom (154), sides (155) and the like. The dimensional aspects of an object, on the other hand, refer to its length (141), height (142) and width (143). In parallel fashion, the prior art concrete block (501) would also comprise equivalent prior art reference bearings (515) of its own (501), including its face (551), backside (552), top (553), bottom (554) and sides (555).

The term fluvial is merely one of technical usage generally referring to the flow of a liquid such as where the fluvial outflow within the block's vertical interior duct (192) is considered for water emitted from the botanical well (121).

The word stack is employed herein to denote placement of the blocks (1, 501) one directly atop another (1, 501) as distinguished from some_other placement pattern such as running bond (23), ante, for example.

The concrete building block (501) of prior art has been with us probably since the early part of the 19th Century. It has been properly considered in terms of its reference bearings (515), including its face (551), backside (552), top (551), bottom (552) and sides (555) Its (501) shape provided it a number of right-angled corners (517) and most of them (501) comprised_reinforcement alignment block hollows (511) which lightened the block's (501) weight and, when properly set up in construction, permitted metal rods or posts to pass vertically through them (501) to strengthen the structure they (501) were part of. To their (501) credit, some also comprised one or more spacing knuckles (516)-relatively small protrusions to abut those of an adjoining_block (501)—along each of their sides (555). When the blocks (501) were installed within a wall (502), the spacing knuckles themselves (516), when present, were situated to allow a small separation for retention and enhanced curing of mortar applied at the joint, or seam (24) between the blocks (501). The blocks (501) were formed to fit well together to form a prior art vertically straight edifice wall (501). Experience soon taught the advantages of installing the blocks (501) in what became known as a running bond (23) masonry pattern. In that arrangement, the seam (24) between two horizontally adjoining blocks (501) became aligned generally with the longitudinal midpoint of a block (501) disposed immediately below it (24). Thus constructed, each block (501) was disposed above portions of two underlying blocks (501) such that the weight of the overlying one (501) was evenly distributed upon the two (501) below. While some other arrangements were also devised, a stacked pattern, in which each block (501) would have been placed directly above another (501), was obviously less preferred for failing to provide the advantages of the running bond (23).

The notion that flower pots or plant beds might be disposed within a cavity in a building block (501) began appearing at least as early as 1960 but a greater number of them emerged, in Europe at first, 25 or 30 years ago. With the exception of a 1917 building block (501) structure designed only to more efficiently grow plants (250) in U.S. Pat. No. 1,217,239 issued to Shwartz and a 1950 vertical arrangement of plant containing blocks (501) merely as part of a fence in U.S. Pat. No. 2,514,536 issued to Burney, almost all—if not all—focused attention upon retaining walls and shared the concept of block (501) erection in an upwardly terraced manner, the blocks (501) retained in place by force of gravity. Such construction logically provided better support to keep the earth from pushing through than would a vertically straight wall (502). and also beneficially exposed a greater portion of the plant bed situated within the blocks (501). U.S. Pat. No. 6,874,293 issued to Manthei provided a typical example along with several patents cited therein. Along the way, U.S. Pat. No. 4,521,138 issued to Steiner featured a semi-circular block hollowed out to contain soil (201) and growing plants (250) and later, in U.S. Pat. No. 4,964,761 issued to Rossi, a French inventor, a very suitable shape was conferred upon a block (501) to make it project outward to even more obviously display the plant (250) bed.

The walls (502) of buildings, on the other hand, often comprised, as many still do today, what are herein designated traditional prior art concrete blocks (501) retained in place not only by force of gravity but, as well, by what is herein designated a form of attachment-adhesion by reason of application of mortar in seams (24) between them (501) and in spaces underneath and above them (501).

The focus of attention in this realm has shifted to economical conversion of energy concerns—the use of living botanical forms to radiate heat from a building, deriving power to accomplish this air-conditioning task from nature itself in what is generally recognized as a form of energy conversion. The upwardly terraced arrangement characteristic of the potted retainer wall exposed a relatively large plant bed to maximize this effect. To adopt the general scheme for application to a building's vertically straight walls (2) necessitates reducing the plant bed's size but could, nonetheless, provide the sought-after cooling effects if the number of plants (250) were multiplied over and over as they (250) are in the terraced retainer walls. While there would have to be some exterior protrusion of the planter-block (1) to catch the plant-building elements, outward offset from the wall's (2) center of gravity has to be avoided to avoid its (2) possible collapse. Dedicated engineering in design can properly fulfill the need.

While the retainer walls of prior art have strongly suggested the direction the merging of plant life into concrete structures should go, much must still be done in the way of clever block design and arrangement to adapt those beginnings into a vertically straight wall (2) of a building in a manner which offers significant energy saving potential.

BRIEF SUMMARY OF THE INVENTION

The invention hereof addresses the concept of using growing plants (250) as media to cool the interior of a building so as to reduce the load otherwise imposed by energy consuming air-conditioning apparatus. Because studies have revealed that species of greenery, or plants (250), comprise energy radiating capacities inherent in the chemistry of their (250) growth, a disposition of them (250) over the expanse of a building wall (2), if sufficiently multiplied in number, can satisfactorily perform this task, particularly in the earth's hotter climates and certainly, in any locale during the year's warmer months. A plant-studded wall (2) is, therefore, conceived and presented herein as an important contribution to the need for energy conversion in dwellings for the earth's inhabitants.

A concrete construction block (501) is, therefore, modified to become a planter-block (1) so that it can be mounted upwards in an acceptable pattern within an edifice wall (2) and additionally support a multitude of plants_(250) over the expanse of the wall's exterior (22). So modified, the block (1) exposes an open portion thereof filled with plants (250) and soil (201) to sunlight and the surrounding elements much in the way some of the innovative retaining walls. However, unlike the constituents of the retaining wall, the planter-block (1) herein provided is formed and balanced so that it may be successfully mortared in place so as to form what might be colloquially described as a "green" wall (2) extending upward in a vertically straight fashion.

BRIEF DESCRIPTION OF THE SEVERAL VIEWS OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention.

DETAILED DESCRIPTION OF THE INVENTION

Figure 1:
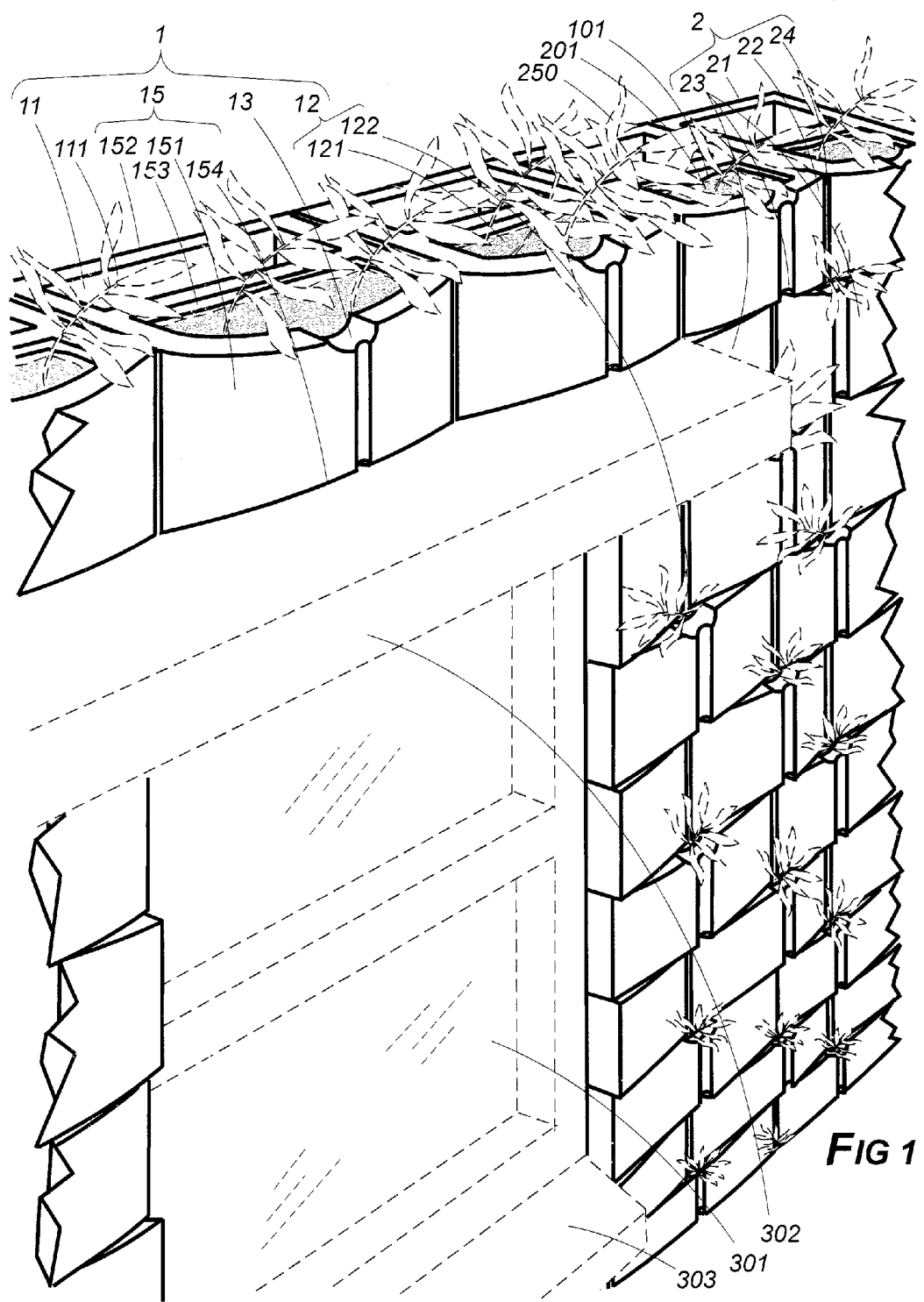
FIG. 1 is a perspective view of a preferred running bond (23) version of a portion of an edifice wall in which all of the construction blocks therein comprise planter-blocks (1) arranged in horizontally and vertically uniform array, the row exhibited as the top one left uncovered for viewing purposes.
Figure 2:
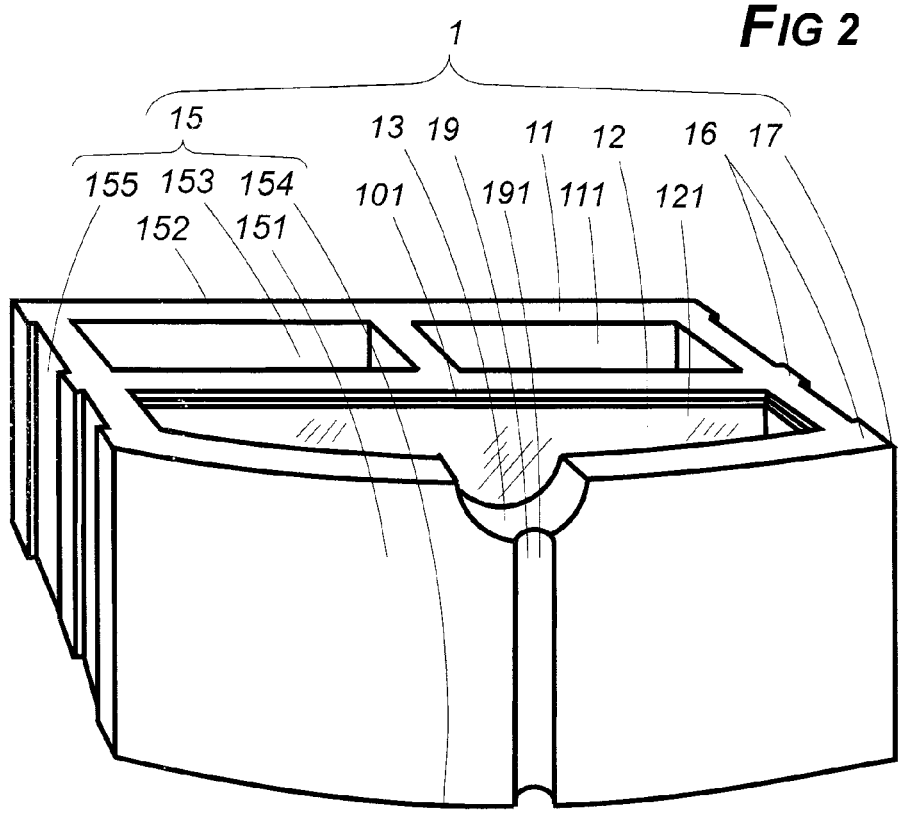
FIG. 2 depicts in perspective from above, a singular planter-block (1) comprising a waterproof liner (101).
Figure 3:
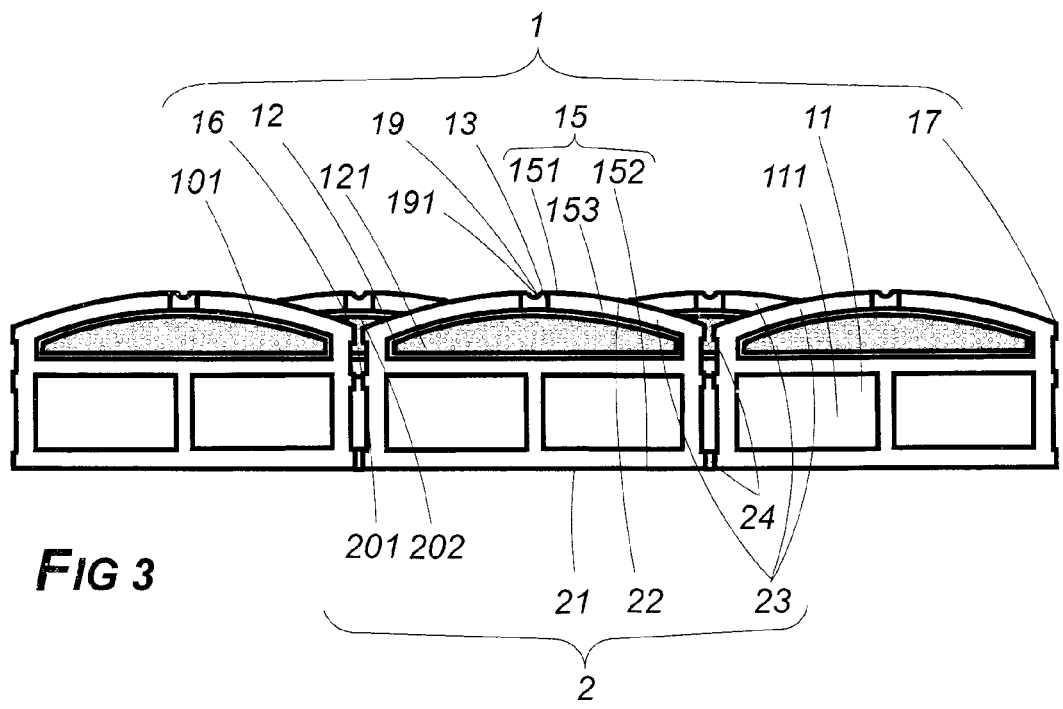
FIG. 3 comprises an overhead view of planter-blocks (1) arranged in running bond (23) pattern displaying exposed botanical niches (202) therein.
Figure 4:
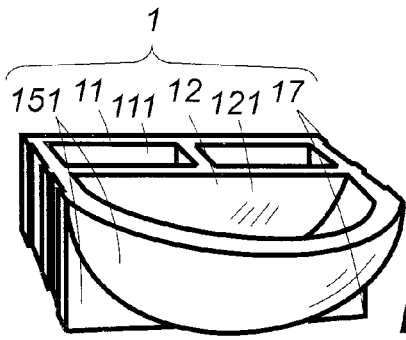
FIGS. 4-7 represent configurations of planter-blocks (1) wherein the faces (151) are shown with enlarged cantilevering protrusions which, respectively, are curved, V-shaped, rectangular and polygonal.
Figure 5:
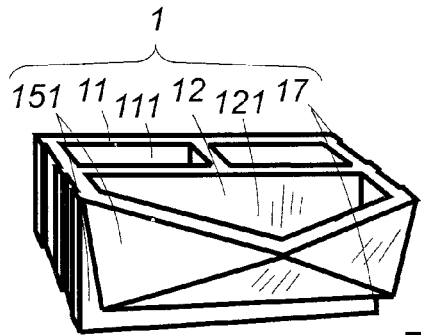
Figure 6:
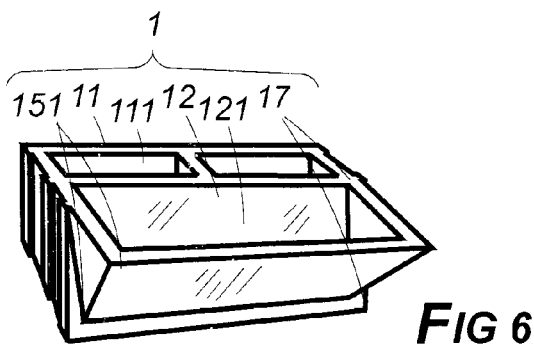
Figure 7:
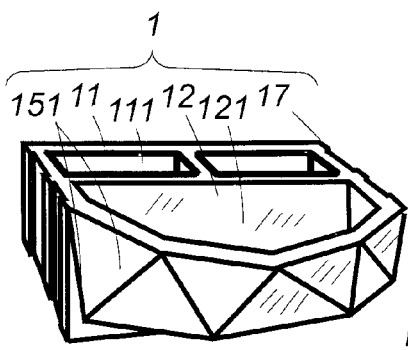
Figure 8:
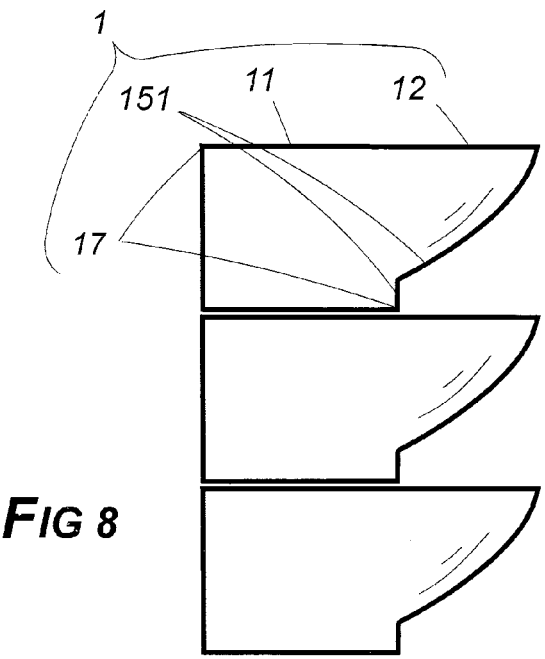
FIG. 8 demonstrates the cantilevered aspect of planter-blocks (1) comprising enlarged facial (151) protrusions when placed atop one another (1).
Figure 9:
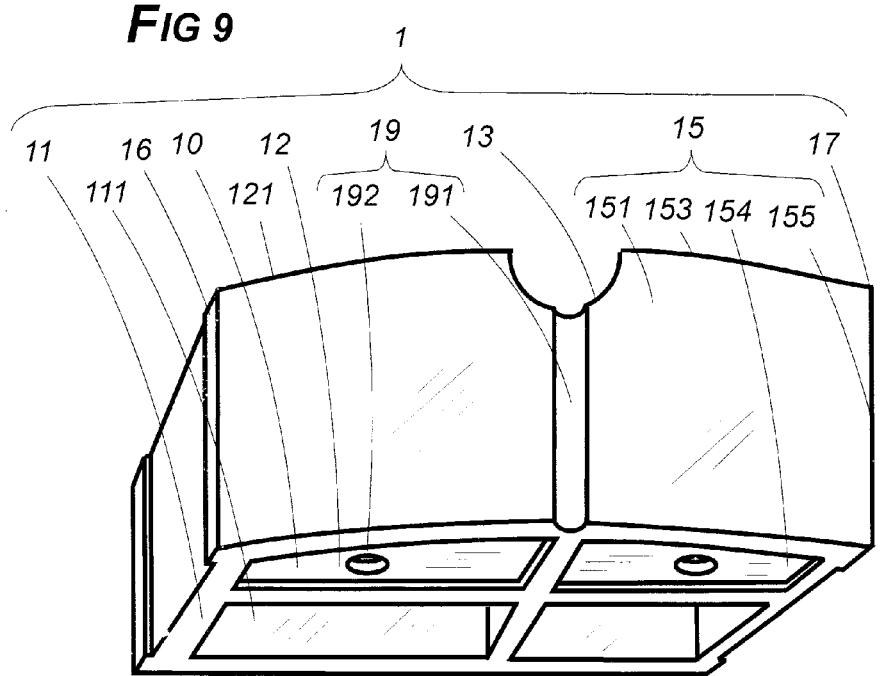
FIG. 9 illustrates in perspective from below, a planter-block variant comprising a circumferential ridge (10) and but two spacing knuckles (16) along each side (155).
Figure 10:
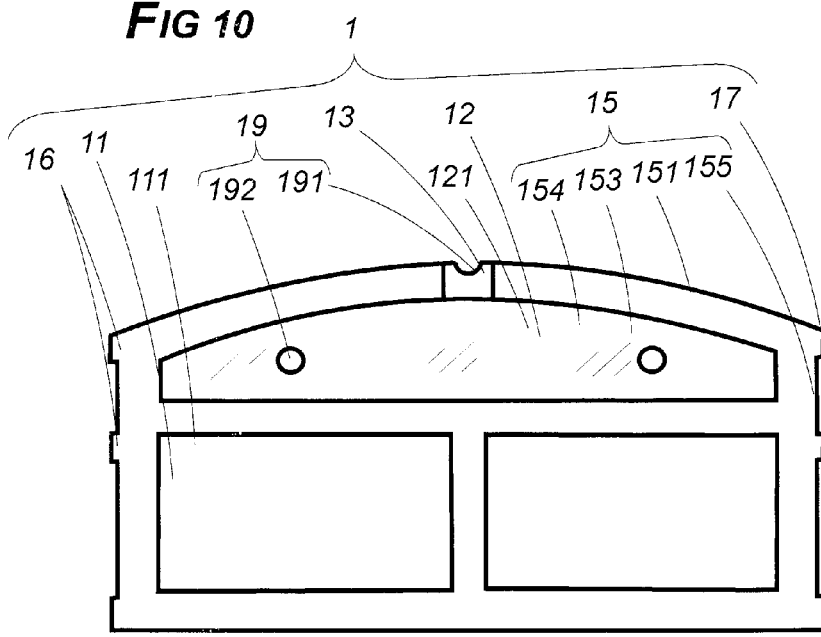
FIG. 10 represents an overhead view of an unfilled planter-block (1) (1) wherein a drainage overflow channel (191) and a vertical interior duct (192) comprise the planter-block's drainage means (19).
Figure 11:
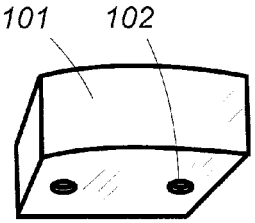
FIG. 11 illustrates a planter-block's waterproof liner (101).
Figure 12:
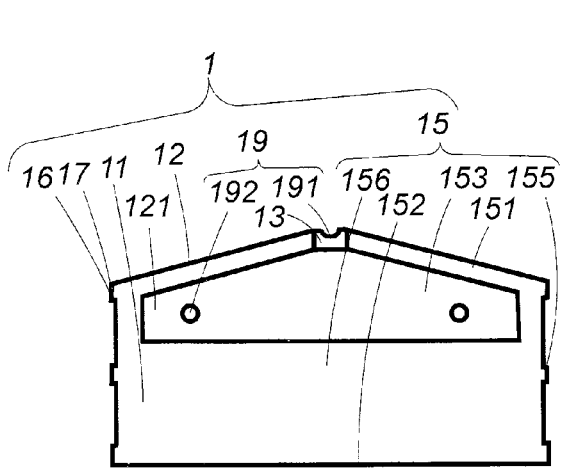
FIGS. 12 and 13 comprise overhead views of planter blocks (1) in which their faces (151) are configured with flat panels, rather than convexly as shown elsewhere herein, a reinforcement alignment block hollow (111) absent in the former.
Figure 13:
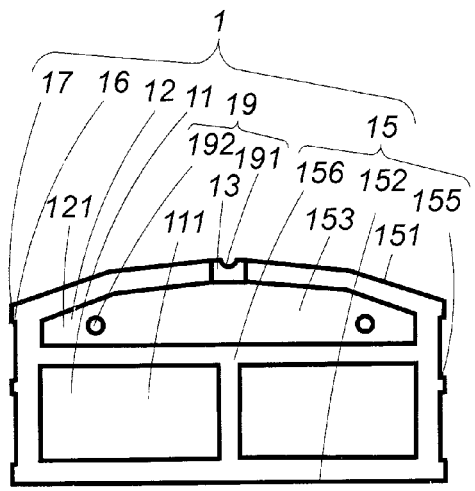
Figure 14:
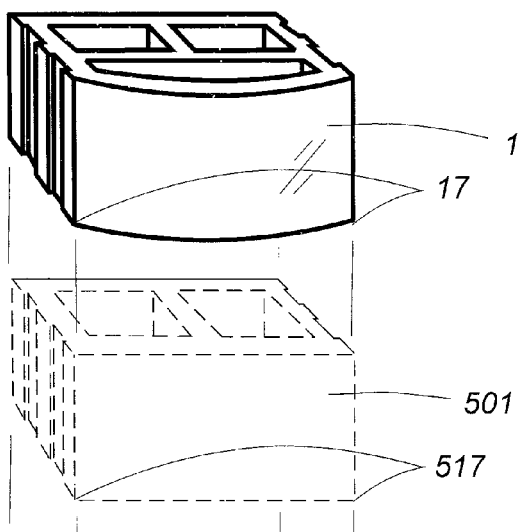
FIGS. 14 and 15 illustrate the manner in which planter-blocks (1) of preferred size would fit corner (17, 517)-to-corner (17, 517) with prior art blocks (501) if one (1, 501) were stacked on top of another (1, 501).
Figure 15:
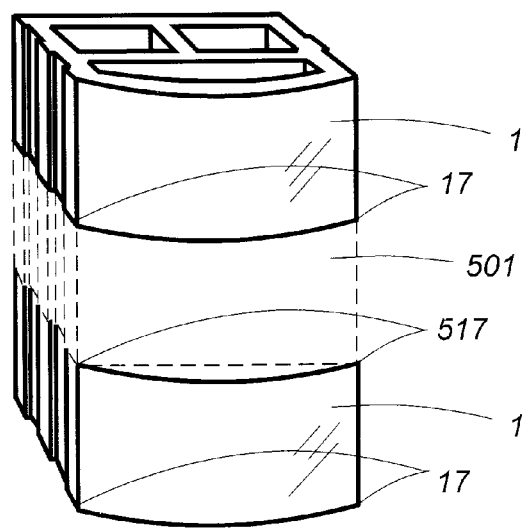
Figure 16:
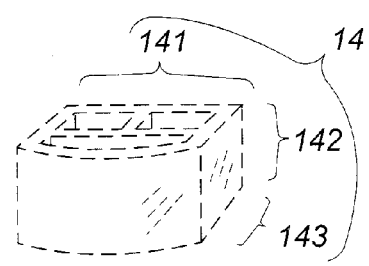
FIG. 16 shows a representative block's dimensional aspects (14) as to length (141), height (142) and width or front-to-back distance (143), along the sides (155).
Figure 17:
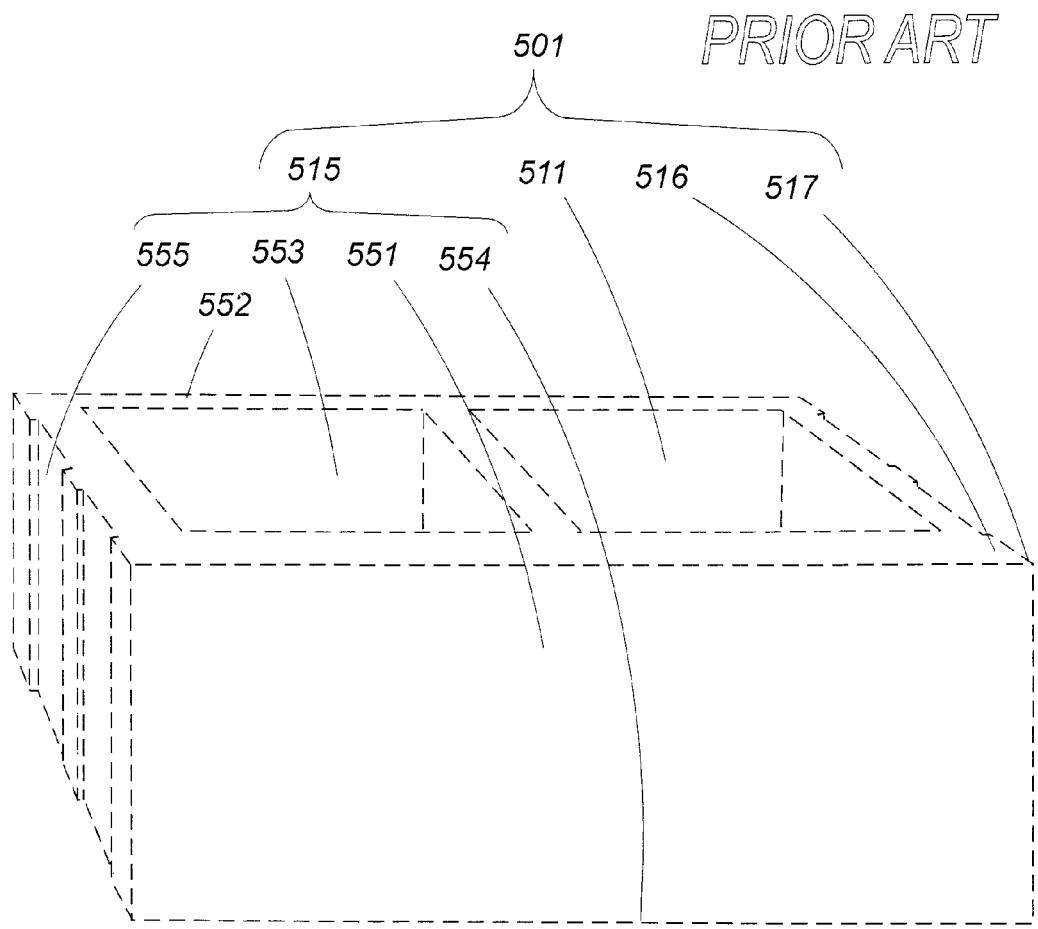
FIG. 17 depicts a prior art block (501).
Figure 18:
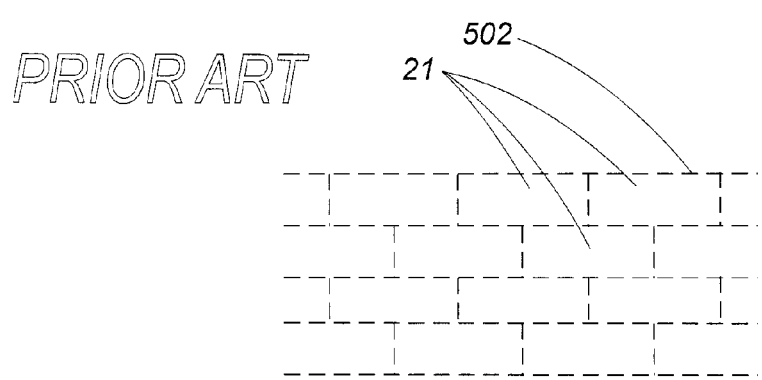
FIG. 18 illustrates representative blocks or bricks in traditional running bond (23) pattern.

The subject matter of this application is considered in two respects. In one, it comprises a particular sort of masonry block identified herein as a planter-block (1) and in the other, a wall (2)—part of a botanically studded edifice—in which the blocks (1) are arranged.

The edifice is constructed to comprise one or more circumferential walls (2), each comprising an interior side (21) and an exterior side (22)—or what is commonly understood to be the inside and the outside thereof.

Each planter-block (1) comprises as its dimensional aspects (14), length (141), height (142) and width (143). Its reference bearings (15) comprise a face (151), a backside (152), an open top (153), a bottom (154) and opposing sides (155). The portions or sectors of the block (1) encompassed by these reference bearings (15) dispose upon the planter-block (1) a number of corners (17) with respect to one another of their (15) edges. A first portion (11) of the planter-block (1) comprises the part disposed toward the backside thereof (152) along its length (141). A second portion (12) comprises that disposed toward the face thereof (151). When a planter-block (1) is installed to become part of a wall (2), all or a portion of its face (151) is presented outward upon the wall's exterior side (22) and the backside thereof (152), inwardly situated upon the wall's interior side (21).

The planter-block (1) is configured so as to dispose all or a portion of its face (151) outward in cantilevered protrusion. It's (151) protrusion most preferably comprises a convex configuration, curved such that most of it projects outward about midway along its length (141). The protrusive character of the face (151) may, however, need not necessarily be curved but in some variants, may instead be configured with straight, flattened sectors to project outward at an angle. Thus, a number thereof might project outward in a desired manner to meet at a central point; or two of them, to form a general V-shape. The panels so formed may even be upwardly tapered outward such that the distance of the planter-block's top (153) at its longitudinal midpoint to the backside (152) thereof is greater than that at its bottom (154). The facial (151) protrusion is, thus, cantilevered with reference to vertical aspect of the wall (2). Experience demonstrates that a wall (2) comprised of planter-block's (1) configured as featured herein remains stable and secure even wherein one-third of their (1) net weight—that is, weight without soil (201), plants (250) or water disposed therein (1)—is cantilevered outward. Whatever the protrusion's shape—curved or uncurved, tapered or non-tapered—it is actually the protrusion which provides the sought-after feature focused upon herein.

The planter-block's first portion (11) may comprise one or more reinforcement alignment hollows (111) disposed therein from the block's top (153) to a point proximate its bottom (154) similar to those (511) of the familiar prior art block (501). However, to allow sufficient space for the planter-block's second portion (12), its reinforcement alignment hollows (111), when present, are—depending, of course, upon the planter-block's (1) overall size—typically narrower front-to-back-than those (511) of the prior art block (501).

The planter-block's second portion (12) comprises a botanical well (121) configured as a cavity extending from the planter-block's top (153) to a point proximate its bottom (154). It is this sector of the planter-block (1) which will contain the growing plants (250) and the soil (201) for their (250) support and nutrition. The botanical well (121) is, therefore, configured to retain and carry them (250), the soil (201) and further, drainage means (19) to allow for the flowage of water. The well (121) should also be configured to accommodate the presence of any pebbles or similar materials emplaced beneath the soil (201) bed to improve drainage.

The planter-block (1) is configured such that when properly installed, it will be plumb with any planter-block (1) of equal size below it as part of a wall (2). Thus, a wall (2) comprising a number of each planter-blocks (1) and prior art blocks (501) can be erected to as to be vertically straight as distinguished from upwardly terraced as in the case of a retaining wall. The same would be true of a wall (2) in which all of the members are planter-blocks (1).

One or more vertical interior ducts (192) are disposed through the bottom of the block's botanical well (121) to allow fluvial outflow therefrom (121), much as in the case of a household flowerpot. While these interior ducts (192) may comprise the planter-block's sole drainage means (19), additional means (19) may be devised in some variants of the invention, ante.

Like its prior art counterparts (501), the planter-block (1) preferably comprises one or more spacing knuckles (16) along each of the block's sides (155) such that the remaining portions of the sides themselves (155) are slightly recessed. So included as a feature herein, the spacing knuckles (16) accomplish the same task assigned to their prior art counterparts (516), supra.

When the planter-blocks (1) are installed in a running bond (23) masonry pattern, as preferred but not necessarily insisted upon, supra, an exposed botanical niche (202) is disposed at the most outward portion of the planter-block's facial projection in direct alignment with the masonry seam (24) between the two overlying blocks (1), supra. Moreover, the fluvial outflow from each vertical interior drainage duct (192) comprised by each overlying planter block (1) is disposed and configured to allow fluvial outflow therefrom to enter, by reason of the running bond (23) pattern, into a respective planter-block's botanical well (121) disposed immediately below it (192).

It is generally preferred for the sake of maximum plant cooling efficiency and aesthetic uniformity that the entirety of an edifice wall (2) be comprised only of planter-blocks (1), in which case they (1) may be said to be arranged in horizontally and vertically uniform array. However, it is feasible as well to dispose a mixture of prior art blocks (501) and planter-blocks (1) in some aesthetically acceptable arrangement. There are possibilities in block (1, 501) arrangement which might be aesthetically pleasing. The planter-blocks (1) might be arranged within a wall (2) in separated horizontal rows, separated vertical columns or separated diagonals, for example.

It is the configuration, not the size, of the block (1) which is the primary consideration herein. However, the planter-block's (1) size may well determine how well it (1) is suited for a given wall (2). Even a block (1) larger than those surrounding it (1) is acceptable for certain constructions, ante. So long as it (1) comprises the featured configuration it (1) may, in given circumstances, even be shorter than a conventional one (501)—the size of what is recognized a half-block wherein only one reinforcement alignment block hollow (111) might be present, for example. Where the blocks (1) are disposed in special aesthetic patterns, supra, or even merely at various places in the wall (2), their size (1) may be large enough so that they (1) project outward from the general surface of the wall (2). Such an arrangement, providing greater outward protrusion of the block's face (151), would increase exposure of the botanical well to the sun and elements. However, it is much preferred in construction protocol to assure that the planter-block (1) comprise size such that its (1) bottom four corners (17) would fit exactly over the top four corners (517) of a prior art block (501) if the former (1) were placed directly atop the latter (501) merely to check the size; and the converse, that the planter-block's top four corners (17) would fit exactly under a prior art block's bottom four corners (517). The preference for these match-ups does not, of course, mean that the blocks (1, 501) should be so stacked in a wall (2)—since we have already examined the preference for a running bond (23) arrangement-but merely that the respective sizes should preferably be so related. When attention is, thus, paid to matching sizes, one block (1, 501) becomes interchangeable with another (1, 501). One will readily observe the advantages inherent in such an arrangement.

It will, of course, be observed that corner (17, 517)-to-corner (17, 517) uniformity of size between planter-blocks (1) and prior art blocks (501) leaves an exposed botanical niche (202) of fairly limited size for plant (250) growth. Experience has demonstrated the advantage of conferring an emergence cleft (13) upon the upper portion of the planter-block's face (151). The emergence cleft (13) comprises a cutout portion in the upper edge of the face (151) upper edge of size such that it (13) does not permit the soil (201) to wash outward through it (13) from the well (121) but large enough to enhance the emergence of growing plant from it (121).

If an emergence cleft (13) is present, a drainage overflow channel (191) may also be formed as additional drainage means (19). The overflow channel (191) comprises a trough-like cut from the bottom of the emergence cleft (13) to the bottom of the block (1).

It is preferred that a portion of the planter-block's bottom (154) be recessed so as to provide a circumferential ridge (10) at its perimeter. The recess—and, therefore, the height of the ridge (10)—might, preferably, be of small dimension—say, a half-inch or so. One would observe that the ridge (10) resembles somewhat the spacing knuckles (16), performing the same function, albeit in a vertical—as distinguished from lateral—manner. It is also considered a circumferential ridge (10) would likely aid the seating of the block (1) upon those beneath it (1).

It is also preferred the planter-block's botanical well (121) comprise a waterproof interior liner (101) to deter the block's absorption of potentially damaging water from the plant bed's soil (201). The liner (101) comprises openings (102) disposed therein (101) in alignment with each of the block's vertical interior ducts (192). A waterproof interior liner (101) enhances the prospect of expedient soil (201) and plant (250) removal when changing them (201, 150) is appropriate for any reason. To that end, it is worth considering that the exposed botanical niches (202) between the blocks (1) be large enough for convenient access.

Any windows_or other openings (301) comprised by the edifice wall (2) must be overlain by a header (302) which suitably supports the planter-blocks (1) above it (301) and, preferably, a sill (303) at it's (301) bottom disposed to adequately support the window or opening (301) and adequately ward off any dripping water. While there are also measures which should be taken to assure a suitable top to the wall (2), they are not addressed here but must be devised by builders with the possible aid of engineering consultants. Ultimately, of course, the selected block (1) composition, size and arrangement should benefits as well from calculations from such experts.

The inventor hereby claims:

1. A botanically studded edifice constructed so as to comprise one or more circumferential walls comprising an exterior side and an interior side, each further comprising one or more concrete planter-blocks, each block comprising as its dimensional aspects length, height and width; and further, as reference bearings, a face, a backside, an open top, a bottom and two opposing sides, all of which reference bearings dispose a number of corners about the planter-block's periphery;

wherein a first portion of the planter-block is disposed toward its backside and the wall's interior side, and a second portion is disposed toward the block's face and the wall's exterior side and comprises a botanical well configured as a cavity extending from the planter-block's top to a level proximate its bottom, to retain and carry one or more growing plants, soil as a supportive and nurturing medium for the plant's growth and drainage means to allow the flow of water;

the second portion of the planter-block configured so as to dispose all or a portion of its face outward in protrusion such that, when disposed within the wall, a portion of the open top thereof is cantilevered outward in exposure to sunlight at the wall's exterior side;

the planter blocks further comprising length and height dimentionally matching that of a standardized prior art concrete construction block and one or more reinforcement alignment hollows disposed in the first portion thereof from the block's top to a point proximate its bottom, wherein the alignment hollows are narrowed in front-to-back dimension from those of prior art to allow additional space for the planter-block's second portion;

wherein the face of the planter-block is upwardly tapered outward such that the distance of the planter-block's to from its face to the backside thereof is greater than at its bottom;

the planter-block further comprising an emergence cleft disposed generally at the longitudinal midpoint of the to of the block's face and configured as a cutout of the to portion of the face thereat, whereby plants within the botanical well are provided additional space for upward extension of their growth;

wherein each planter-block is disposed so as to be plumb with every planter-block of equal size which is part of the wall below it;

wherein at least one of the drainage means comprises a vertical interior duct disposed through the bottom of the block's botanical well to allow fluvial outflow therefrom;

wherein the plants, by reason of the chemistry of their growth upon receiving sunlight and moisture through the exposed portion of the open top of the planter-block and consequent evaporative phenomena from their leaves, radiate into the surrounding atmosphere unwanted heat otherwise produced within and retained by the edifice.

2. A botanically studded edifice according to claim 1 wherein portions of each side of a planter-block are recessed to provide spacing knuckles therealong;

whereby portions of horizontally adjoining blocks are slightly displaced from one another to provide room for block expansion and enhance mortar curing and retention thereat.

3. A botanically studded edifice according to claim 1 wherein every block comprised by one or more of the edifice's circumferential walls is a planter-block;

wherein the benefits conferred by the wall's botanical effects are maximized.

4. A botanically studded edifice according to claim 1 wherein the concrete planter-blocks are disposed in an aesthetic formation comprising one of separated horizontal rows thereof; separated vertical columns thereof; and separated diagonals thereof.

5. A botanically studded edifice according to claim 1 wherein each planter-block further comprises as additional drainage means, an exterior overflow channel disposed vertically upon the block's face in extension from the emergence cleft to the bottom of the block's facial protrusion;

wherein the drainage of excessively pooled water deposited by rain or otherwise is enhanced.

6. A botanically studded edifice according to claim 1 wherein the distance along the planter-block's sides extending from the face to the backside thereof matches that distance on a standard prior art concrete block, such that the four corners of the bottom of the planter-block would be disposed in vertical alignment with the four corners of the top of any standard prior art concrete block disposed directly below it; and the four corners of the top of the planter-block would also be disposed in such alignment with the four corners of the bottom of any respective standard prior art concrete block disposed directly above it.

7. A botanically studded edifice according to claim 6 wherein all of the blocks thereof, whether standard prior art concrete blocks or planter-blocks, are disposed in running bond masonry pattern such that the seam between two horizontally adjoining blocks is aligned generally with the longitudinal midpoint of a block disposed immediately below it;

wherein each planter block disposed beneath portions of two overlying planter-blocks by reason of the running bond pattern, dispose in direct alignment with the masonry seam between the two an exposed niche comprising the most outward portion of the planter-block's facial projection; and wherein further, by reason of the running bond pattern, each vertical interior drainage duct comprised by each overlying planter block is configured to allow fluvial outflow therefrom to enter into a respective planter-block's botanical well disposed immediately below it.

8. A botanically studded edifice according to claim 6 wherein the dimensions considered for the standard prior art concrete block and those of the planter-block based thereon comprise length equal, generally, to 15 and seven-eighths inches, height, equal, generally, to seven and five-eights inches and distance of the planter-block's bottom along each side extending from the face to the backside thereof equals, generally, seven and five-eighths inches.

9. A concrete planter-block configured for incorporation into a circumferential wall of an edifice, each planter-block dimensionally comprising length, height and width; and further, as reference bearings, a face, a backside, an open top, a bottom and two opposing sides, all of which reference bearings dispose a number of corners about the planter-block's periphery; the planter-block configured such that those installed in a wall, it will be disposed in plumb with any planter-block of equal size which is part of a wall below it;

wherein a first portion of the block is disposed toward its backside;

and a second portion, disposed toward its face and configured so as to dispose all or a portion of its face outward in cantilevered protrusion, comprises a botanical well configured to retain and carry a growing plant, soil as a supportive and nurturing medium for the plant's growth and drainage means to allow the passage of water;

the planter block further comprising length and height dimentionally matching that of a standardized prior art concrete construction block and one or more reinforcement alignment hollows disposed in the first portion thereof from the block's top to a point proximate its bottom, wherein the alignment hollows are narrowed in front-to-back dimension from those of prior art to allow additional space for the planter-block's second portion;

wherein the face of the planter-block is upwardly tapered outward such that the distance of the planter-block's top from its face to the backside thereof is greater than at its bottom;

the planter-block further comprising an emergence cleft disposed generally at the longitudinal midpoint of the top of the block's face and configured as a cutout of the top portion of the face thereat, whereby plants within the botanical well are provided additional space for upward extension of their growth;

wherein the plants, by reason of the chemistry of their growth, radiate into the surrounding atmosphere unwanted heat otherwise retained by and within the edifice.

10. A concrete planter-block according to claim 9 wherein the distance along its sides extending from the face to the backside thereof matches that distance on a standard prior art concrete block, such that, if installed in a wall, the four corners of the bottom of the planter-block would be disposed in vertical alignment with the four corners of the top of any standard prior art concrete block underlying it and the four corners of the top of the planter-block would also be disposed in such alignment with the four corners of the bottom of any standard prior art concrete block overlying it.

11. A concrete planter-block according to claim 9 wherein a a portion of the bottom of the block's botanical well is recessed so as to provide a circumferential ridge at its perimeter; the botanical well further comprising a waterproof interior liner in turn comprising openings disposed therein in alignment with each of the block's vertical interior drainage means.

12. A concrete planter-block according to claim 9 further comprising as one of the drainage means, an exterior overflow channel vertically disposed upon the block's face from the emergence cleft to the bottom of the block's facial protrusion; wherein the drainage of excessively pooled water deposited by rain or otherwise is enhanced.

* * * * *